United States Patent
Aoyama et al.

(10) Patent No.: US 11,592,964 B2
(45) Date of Patent: Feb. 28, 2023

(54) IMAGE DISPLAY DEVICE, IMAGE FORMING APPARATUS, AND DISPLAY POSITION CHANGING METHOD

(71) Applicant: Konica Minolta, Inc., Tokyo (JP)

(72) Inventors: Motoaki Aoyama, Hino (JP); Jun Shiraishi, Toyokawa (JP); Kazuyuki Kawabata, Toyokawa (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 17/329,404

(22) Filed: May 25, 2021

(65) Prior Publication Data
US 2021/0400152 A1    Dec. 23, 2021

(30) Foreign Application Priority Data
Jun. 17, 2020    (JP) .............................. JP2020-104721

(51) Int. Cl.
| | |
|---|---|
| G06F 3/0482 | (2013.01) |
| G06F 3/04817 | (2022.01) |
| G06F 3/0484 | (2022.01) |
| H04N 1/00 | (2006.01) |
| G06F 3/0486 | (2013.01) |
| G06F 3/0488 | (2022.01) |

(52) U.S. Cl.
CPC .......... *G06F 3/0482* (2013.01); *G06F 3/0484* (2013.01); *G06F 3/0486* (2013.01); *G06F 3/0488* (2013.01); *G06F 3/04817* (2013.01); *H04N 1/00411* (2013.01); *H04N 1/00413* (2013.01); *H04N 1/00477* (2013.01)

(58) Field of Classification Search
CPC .. G06F 3/0486; G06F 3/04817; G06F 3/0484; G06F 3/0482; G06F 3/0488; H04M 1/72469; H04N 1/00411; H04N 1/00413; H04N 1/00477
See application file for complete search history.

(56) References Cited

U.S. PATENT DOCUMENTS

| | | | |
|---|---|---|---|
| 2016/0044191 A1* | 2/2016 | Okada ............... | H04N 1/00413 358/1.13 |
| 2016/0170600 A1* | 6/2016 | Horiike ............. | G06F 3/0486 715/769 |
| 2017/0277380 A1* | 9/2017 | Shan ................... | G06F 3/04817 |
| 2017/0336944 A1* | 11/2017 | Liu ..................... | G06F 3/04842 |
| 2018/0196589 A1 | 7/2018 | Feit et al. | |
| 2019/0102060 A1* | 4/2019 | Ishida ................ | G06F 3/0486 |

FOREIGN PATENT DOCUMENTS

JP    2017-219893 A    12/2017

OTHER PUBLICATIONS

Extended European Search Report issued in corresponding European Patent Application No. 21178028.3 dated Nov. 15, 2021 (11 pages).

* cited by examiner

*Primary Examiner* — Nicholas Ulrich

(74) *Attorney, Agent, or Firm* — Osha Bergman Watanabe & Burton LLP

(57) ABSTRACT

An image display device includes: an operation receiver that receives an operation to select and move, as a movement source icon, at least one of a plurality of icon images displayed on a display screen; and a hardware processor that, once the operation receiver receives the operation, changes a display position of the movement source icon while assuming that a first position of the movement source icon is selected on the display screen.

11 Claims, 14 Drawing Sheets

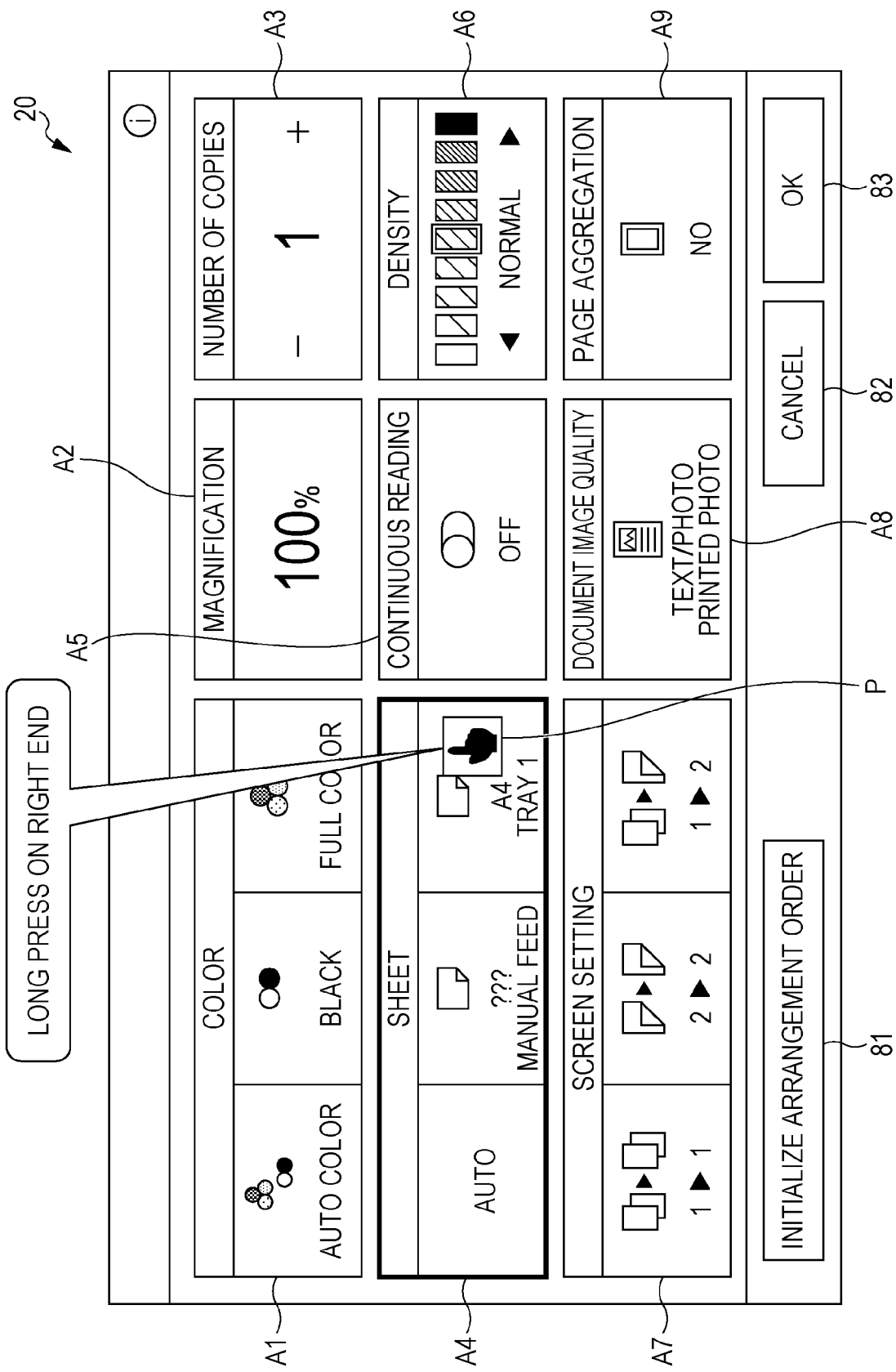

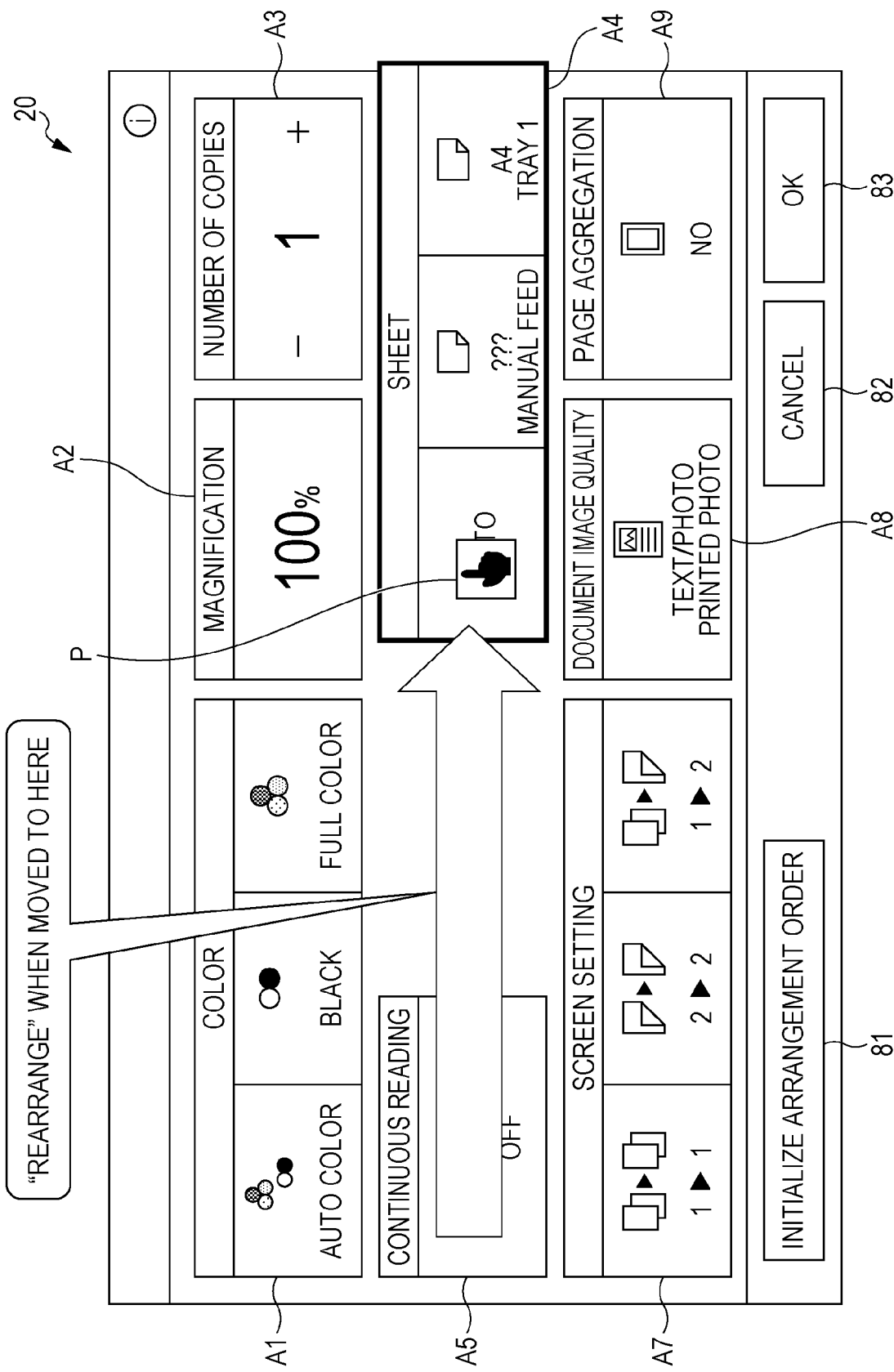

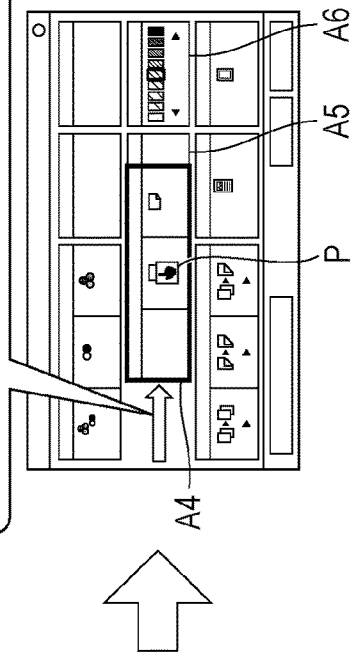
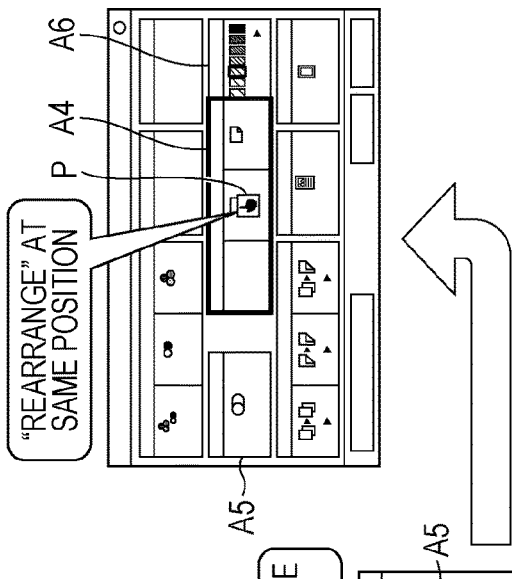
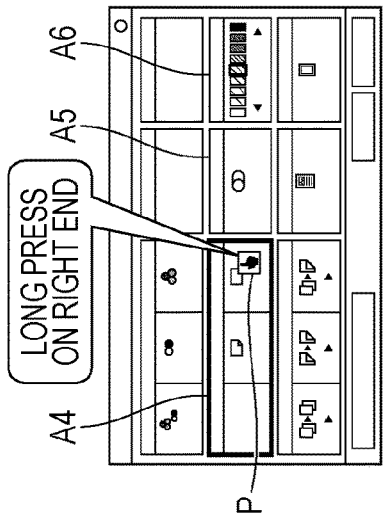
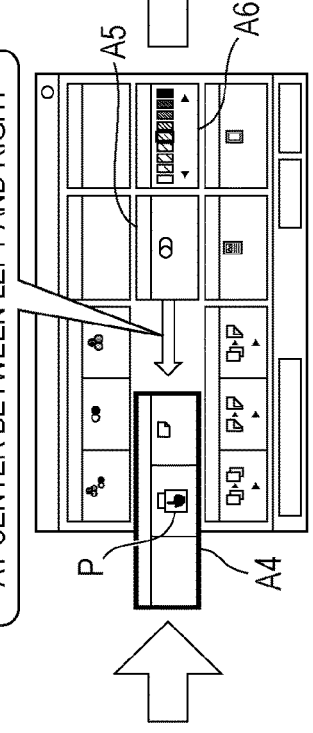
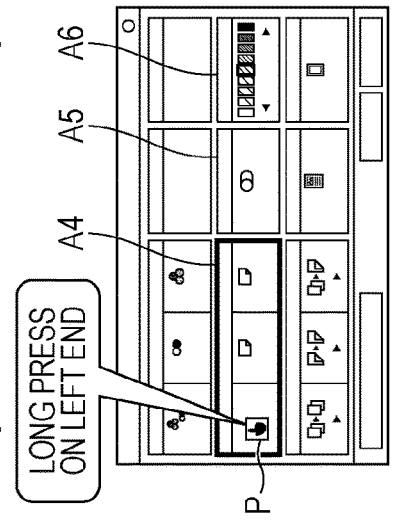

IMAGE DISPLAY DEVICE, IMAGE FORMING APPARATUS, AND DISPLAY POSITION CHANGING METHOD

CROSS-REFERENCE TO RELATED APPLICATION

The entire disclosure of Japanese patent Application No. 2020-104721, filed on Jun. 17, 2020, is incorporated herein by reference in its entirety.

BACKGROUND

Technical Field

The present invention relates to an image display device, an image forming apparatus, a display position changing method, and a recording medium storing instructions.

Description of the Related Art

Currently, in personal computers, mobile phones, and the like equipped with an operation display unit such as a touch panel display, there are models equipped with a function of freely changing the arrangement, that is, display positions of icons displayed on an operation display unit by performing an operation of touching (sometimes called a tap) any icon with a finger, a touch pen, or the like and moving the icon within a display screen.

Further, for example, as described in JP 2017-219893 A, also in a device for displaying medical information, it is proposed that a user can arbitrarily replace the arrangement of a plurality of "slave screens" corresponding to icons.

Under the background as described above, even in recent image forming apparatuses such as MPF, there is a demand for a function of arbitrarily rearranging a plurality of icons related to various settings displayed on an operation display unit, that is, customizing the arrangement of icons so as to improve usability for the user.

However, depending on the configuration of the touch panel, and the like, when performing an operation to change the display position of an icon (customize the arrangement of the icon), the operating feeling changes depending on the touch position when touching the icon with a finger, a touch pen, or the like, causing a sense of discomfort to the user, and the like.

SUMMARY

One or more embodiments of the present invention provide an image display device, an image forming apparatus, a display position changing method, and a recording medium storing instructions capable of unifying operating feelings at a time of an arrangement changing operation of icons.

According to one or more embodiments of the present invention, an image display device comprises: an operation receiver that receives an operation of selecting and moving a part of a plurality of icon images displayed on a display screen as a movement source icon; and a hardware processor that changes, when the operation is received, a display position of the movement source icon assuming that a first position of the movement source icon is selected on the display screen.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIGS. 8A and 8B are diagrams describing an operation state at a start of operation and during movement when a right end side of the "sheet" icon is long-pressed and rearranging is performed from the display state illustrated in FIG. 3;

FIGS. 9A and 9B are diagrams describing an operation state at a start of operation and during movement when a left end side of the "sheet" icon is long-pressed and rearranging is performed from the display state illustrated in FIG. 3;

FIGS. 10A to 10E are diagrams describing a specific example of an operation of rearrangement of icons in one or more embodiments;

DETAILED DESCRIPTION OF EMBODIMENTS

Hereinafter, embodiments of the present invention will be described with reference to the drawings. However, the scope of the invention is not limited to the disclosed embodiments.

Figure 1:
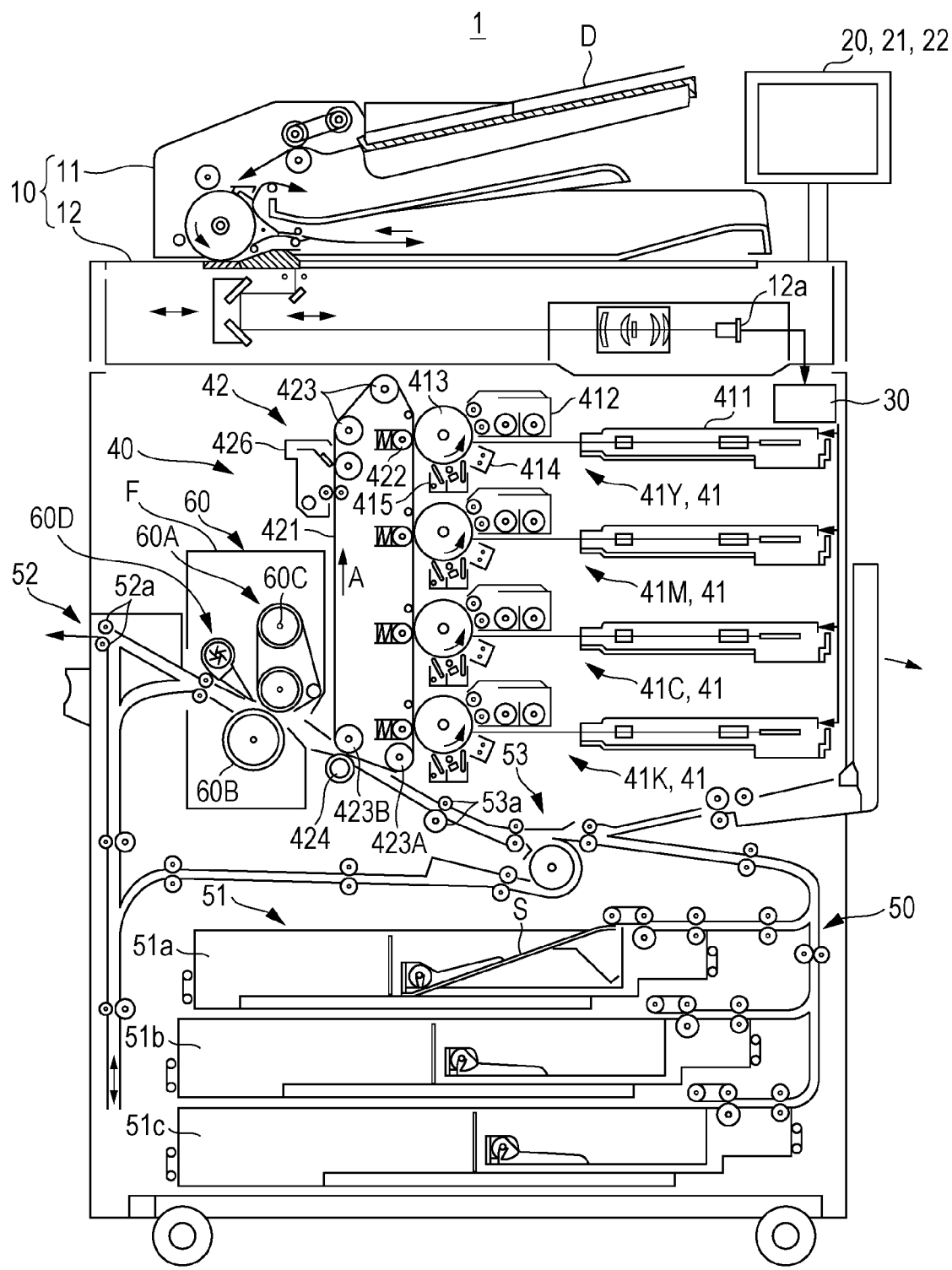
FIG. 1 is a side view illustrating an outline configuration of an image forming apparatus in one or more embodiments.

FIG. 1 is a side view illustrating a schematic configuration of the image forming apparatus 1 in one or more embodiments. Further, FIG. 2 illustrates a main part of a control system of the image forming apparatus 1 in one or more embodiments.

Figure 2:
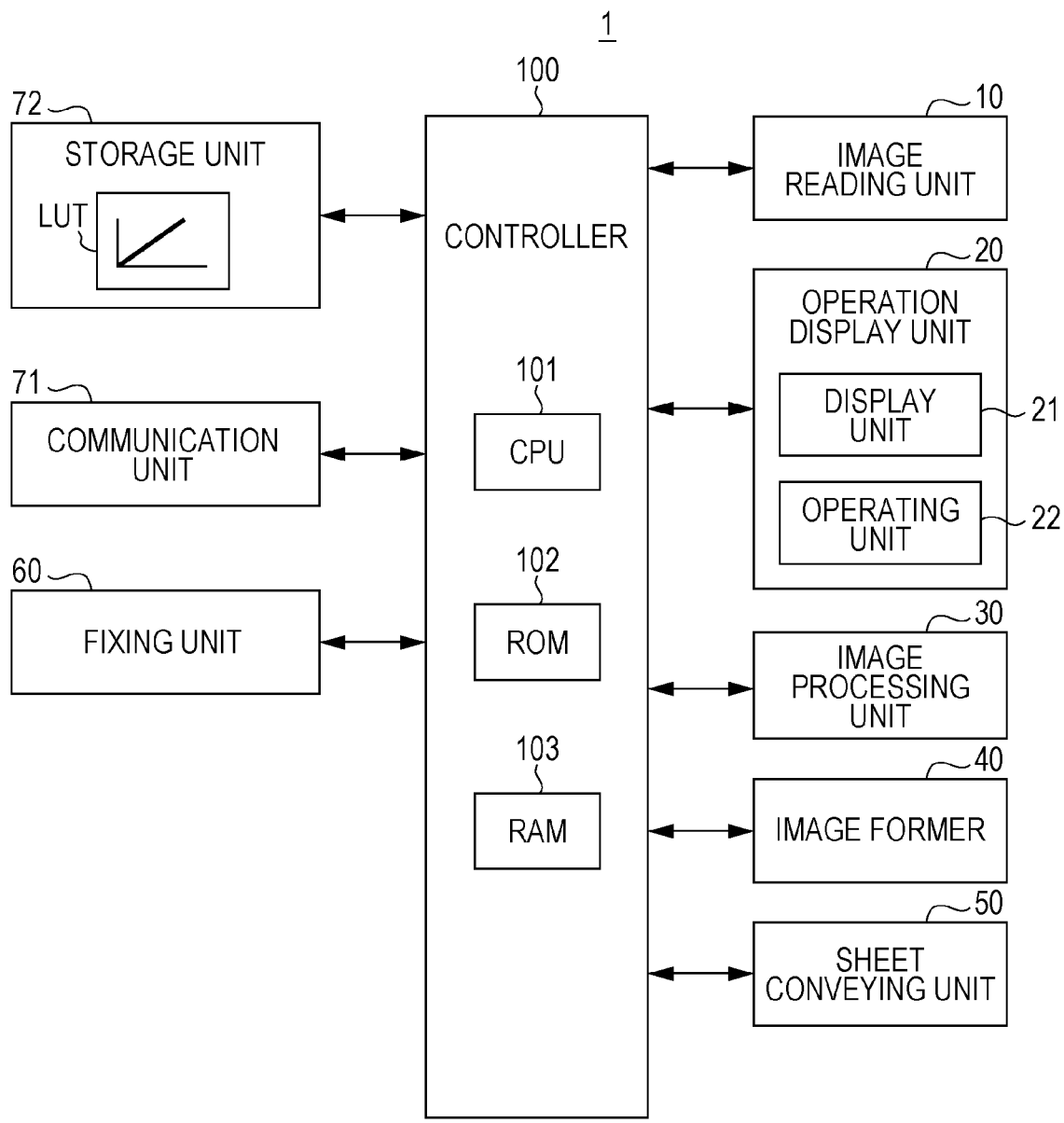
FIG. 2 is a block diagram describing a main function of the image forming apparatus according to one or more embodiments.

The image forming apparatus 1 illustrated in FIG. 1 and FIG. 2 is an intermediate transfer type color image forming apparatus using an electrophotographic process technique. That is, the image forming apparatus 1 primarily transfers toner images of respective colors of yellow (Y), magenta (M), cyan (C), and black (K) formed on a photoconductor drum 413 onto an intermediate transfer belt 421, superimposes the toner images of four colors on the intermediate transfer belt 421, and thereafter secondarily transfers the toner images to a sheet S, to thereby form an image.

Further, in the image forming apparatus 1, a tandem system is employed in which photoconductor drums 413 corresponding to four colors of YMCK are arranged in series in a running direction of the intermediate transfer belt 421, and toner images of the respective colors are sequentially transferred to the intermediate transfer belt 421 in one procedure.

As illustrated in FIG. 2, the image forming apparatus 1 includes an image reading unit 10, an operation display unit 20, an image processing unit 30, an image former 40, a sheet conveying unit 50, a fixing unit 60, a controller 100, and so on.

The controller 100 includes a central processing unit (CPU) 101, a read only memory (ROM) 102, a random access memory (RAM) 103, and the like.

The CPU 101 reads out instructions corresponding to processing content from the ROM 102, expands the instructions in the RAM 103, and centrally controls operation of each block of the image forming apparatus 1 in cooperation with the expanded instructions. At this time, various data stored in a storage unit 72 is referred to. The storage unit 72 includes, for example, a nonvolatile semiconductor memory (what is called a flash memory) or a hard disk drive.

The controller 100 transmits and receives various data to and from an external device (for example, a personal computer) connected to a communication network such as a local area network (LAN) and a wide area network (WAN) via a communication unit 71. The controller 100 receives, for example, image data transmitted from the external device, and forms a toner image on the sheet S based on this image data (input image data). The communication unit 71 includes a communication control card such as a LAN card, for example.

The image reading unit 10 includes an automatic document feeding device 11 called an auto document feeder (ADF), a document image scanning device (scanner) 12, and so on.

The automatic document feeding device 11 conveys a document D placed on a document tray by a conveying mechanism and feeds the document D to the document image scanning device 12. By the automatic document feeding device 11, it is possible to continuously read images (including both sides) of a large number of documents D placed on the document tray all at once.

The document image scanning device 12 optically scans a document conveyed from the automatic document feeding device 11 onto a contact glass or a document placed on the contact glass, allows reflected light from the document to form an image on a light receiving surface of a charge coupled device (CCD) sensor 12*a*, and reads a document image. The image reading unit 10 generates input image data based on a reading result of the document image scanning device 12. The input image data is subjected to predetermined image processing in the image processing unit 30.

The operation display unit 20 includes, for example, a liquid crystal display (LCD) with a touch panel, and functions as a display unit 21 and an operating unit 22. The display unit 21 displays various operation screens, image states, operation states of each function, and the like according to a display control signal input from the controller 100. The operating unit 22 includes various operation keys such as a numeric keypad and a start key, receives various input operations by a user, and outputs an operation signal to the controller 100.

In one or more embodiments, the operation display unit 20 and the controller 100 correspond to the "image display device."

In one or more embodiments, the operation display unit 20 displays a plurality of icon images (hereinafter, simply referred to as "icons") for specifying various processes to be executed by the controller 100 in the display screen of the display unit 21 according to the above display control signal.

Further, the operation display unit 20 detects a touch operation (short press, long press, drag, touch release, or the like) with a finger of the user or a touch pen or the like on the displayed icon, and uses the detection result as an operation signal to control the controller 100.

Details of the above-described icons, touch operations, and the like will be described later with reference to FIG. 3 and so on.

The image processing unit 30 includes a circuit or the like that performs digital image processing on input image data according to initial settings or user settings. For example, the image processing unit 30 performs gradation correction under control of the controller 100 based on gradation correction data (gradation correction table). Further, the image processing unit 30 performs various correction processing such as color correction and shading correction, compression processing, and the like on the input image data, in addition to the gradation correction. The image former 40 is controlled based on the image data that has been subjected to these processes.

The image former 40 includes image forming units 41Y, 41M, 41C, and 41K for forming images with respective color toners of Y, M, C, and K components based on the input image data, an intermediate transfer unit 42, and the like.

The image forming units 41Y, 41M, 41C, and 41K for the Y, M, C, and K components have similar configurations. For convenience of illustration and description, common components are denoted by the same reference numerals, and when distinguishing from each other, reference numerals are appended with Y, M, C, or K. In FIG. 1, reference signs are only given to components of the image forming unit 41Y for Y component, and reference signs are omitted for components of the other image forming units 41M, 41C, and 41K.

The image forming unit 41 includes an exposure device 411, a developing device 412, a photoconductor drum 413, a charging device 414, a drum cleaning device 415, and so on.

The photoconductor drum 413 is, for example, a negatively charged organic photoconductor (OPC) formed by sequentially stacking an under coat layer (UCL), a charge generation layer (CGL), and a charge transport layer (CTL) on a peripheral surface of a conductive cylindrical body (aluminum tube) made of aluminum. The charge generation layer includes an organic semiconductor in which a charge generation material (for example, a phthalocyanine pigment) is dispersed in a resin binder (for example, polycarbonate), and generates a pair of positive and negative charges under exposure by the exposure device 411. The charge transport layer is formed by dispersing a hole transporting material (electron donating nitrogen-containing compound) in a resin binder (for example, polycarbonate resin), and transports positive charges generated in a charge generation layer to a surface of the charge transport layer.

The controller 100 controls a drive current supplied to a drive motor (not illustrated) for rotating the photoconductor drum 413, thereby rotating the photoconductor drum 413 at a constant peripheral speed.

The charging device 414 uniformly charges a surface of the photoconductor drum 413 having photoconductivity with a negative polarity. The exposure device 411 includes, for example, a semiconductor laser and irradiates the photoconductor drum 413 with laser light corresponding to an image of each color component. A positive charge is generated on the charge generation layer of the photoconductor drum 413 and transported to the surface of the charge transport layer, thereby neutralizing the surface charge (negative charge) of the photoconductor drum 413. An electrostatic latent image of each color component is formed on the surface of the photoconductor drum 413 due to a potential difference from the surroundings.

The developing device 412 is, for example, a two-component development type developing device, and causes a toner of each color component to adhere to the surface of the photoconductor drum 413, to thereby visualize the electrostatic latent image to form a toner image. The specific configuration of the developing device 412 will be described later.

The drum cleaning device 415 has a drum cleaning blade or the like that is in sliding contact with the surface of the photoconductor drum 413, and removes transfer residual toner remaining on the surface of the photoconductor drum 413 after the primary transfer.

The intermediate transfer unit 42 includes the intermediate transfer belt 421, primary transfer rollers 422, a plurality of support rollers 423, a secondary transfer roller 424, a belt cleaning device 426, and so on.

The intermediate transfer belt 421 is formed by an endless belt, and is stretched in a loop around the plurality of support rollers 423. At least one of the plurality of support rollers 423 is formed by a driving roller, and the others are formed by driven rollers. For example, a roller 423A arranged downstream of the primary transfer roller 422 for the K component in a belt running direction may be a driving roller. This makes it easier to keep a running speed of the belt in a primary transfer unit constant. Rotation of the driving roller 423A causes the intermediate transfer belt 421 to run in the direction of arrow A at a constant speed.

A primary transfer roller 422 is arranged on an inner peripheral surface side of the intermediate transfer belt 421 so as to face the photoconductor drum 413 of each color component. When the primary transfer roller 422 is pressed against the photoconductor drum 413 with the intermediate transfer belt 421 interposed therebetween, a primary transfer nip for transferring a toner image from the photoconductor drum 413 to the intermediate transfer belt 421 is formed.

The secondary transfer roller 424 is arranged on the outer peripheral surface side of the intermediate transfer belt 421, opposing a backup roller 423B arranged downstream of the driving roller 423A in the belt running direction. The secondary transfer roller 424 is pressed against the backup roller 423B with the intermediate transfer belt 421 interposed therebetween, thereby forming a secondary transfer nip for transferring a toner image from the intermediate transfer belt 421 to the sheet S.

When the intermediate transfer belt 421 passes through the primary transfer nip, the toner images on the photoconductor drum 413 are sequentially overlapped and primary-transferred on the intermediate transfer belt 421. Specifically, a primary transfer bias is applied to the primary transfer roller 422 and a charge having a polarity opposite to that of the toner is given to a back side of the intermediate transfer belt 421 (side in contact with the primary transfer roller 422), thereby electrostatically transferring the toner image to the intermediate transfer belt 421.

Thereafter, when the sheet S passes through the secondary transfer nip, the toner image on the intermediate transfer belt 421 is secondarily transferred to the sheet S. Specifically, a secondary transfer bias is applied to the secondary transfer roller 424 and a charge having a polarity opposite to that of the toner is given to a back side of the sheet S (side in contact with the secondary transfer roller 424), thereby electrostatically transferring the toner image to the sheet S. The sheet S to which the toner image has been transferred is conveyed toward the fixing unit 60.

The belt cleaning device 426 has a belt cleaning blade or the like that is in sliding contact with the surface of the intermediate transfer belt 421, and removes transfer residual toner remaining on the surface of the intermediate transfer belt 421 after the secondary transfer. Note that instead of the secondary transfer roller 424, a configuration in which the secondary transfer belt is stretched in a loop on a plurality of support rollers including the secondary transfer roller (what is called a belt type secondary transfer unit) may be employed.

The fixing unit 60 includes an upper fixing unit 60A having a fixing surface side member arranged on the fixing surface of the sheet S (the surface on which the toner image is formed), a lower fixing unit 60B having a back surface side supporting member arranged on the back surface of the sheet S (the surface opposite to the fixing surface), a heating source 60C, and so on. When the back surface side supporting member is pressed against the fixing surface side member, a fixing nip for sandwiching and conveying the sheet S is formed.

The fixing unit 60 heats and pressurizes the sheet S, to which the toner image has been secondarily transferred and which has been conveyed thereto, with the fixing nip, thereby fixing the toner image on the sheet S. The fixing unit 60 is arranged as a unit in a fixing device F. Further, the fixing device F is provided with an air separation unit 60D that separates the sheet S from the fixing surface side member by blowing air.

The sheet conveying unit 50 includes a paper feed unit 51, a paper discharge unit 52, a conveying path unit 53, and so on. Sheets S (standard paper, special paper) identified based on basis weight, size, or the like are stored according to types set in advance in three paper feed tray units 51a to 51c that constitute the paper feed unit 51. The conveying path unit 53 has a plurality of conveying roller pairs such as a resist roller pair 53a.

The sheets S stored in the paper feed tray units 51a to 51c are sent out one by one from an uppermost part, and are conveyed to the image former 40 by the conveying path unit 53. At this time, a resist roller unit in which the resist roller pair 53a is arranged corrects an inclination of the fed sheet S and adjusts transfer timing. Then, in the image former 40, the toner image on the intermediate transfer belt 421 is secondarily transferred onto one surface of the sheet S at once, and the fixing unit 60 performs a fixing step. The sheet S on which the image is formed is discharged to the outside of the apparatus by the paper discharge unit 52 including a sheet discharge roller 52a.

Incidentally, in the image forming apparatus 1, a function is desired of arbitrarily rearranging a plurality of icons related to various settings displayed on the operation display unit 20, that is, customizing the arrangement of icons so as to improve usability for the user.

However, when performing an operation of replacing the arrangement of icons as desired by the user, depending on the configuration of the touch panel or the like, the operating feeling changes depending on the touch position when the icon is touched with a finger or a touch pen, causing a sense of discomfort to the user. Such a phenomenon will be described with reference to FIG. 3 and so on.

Figure 3:
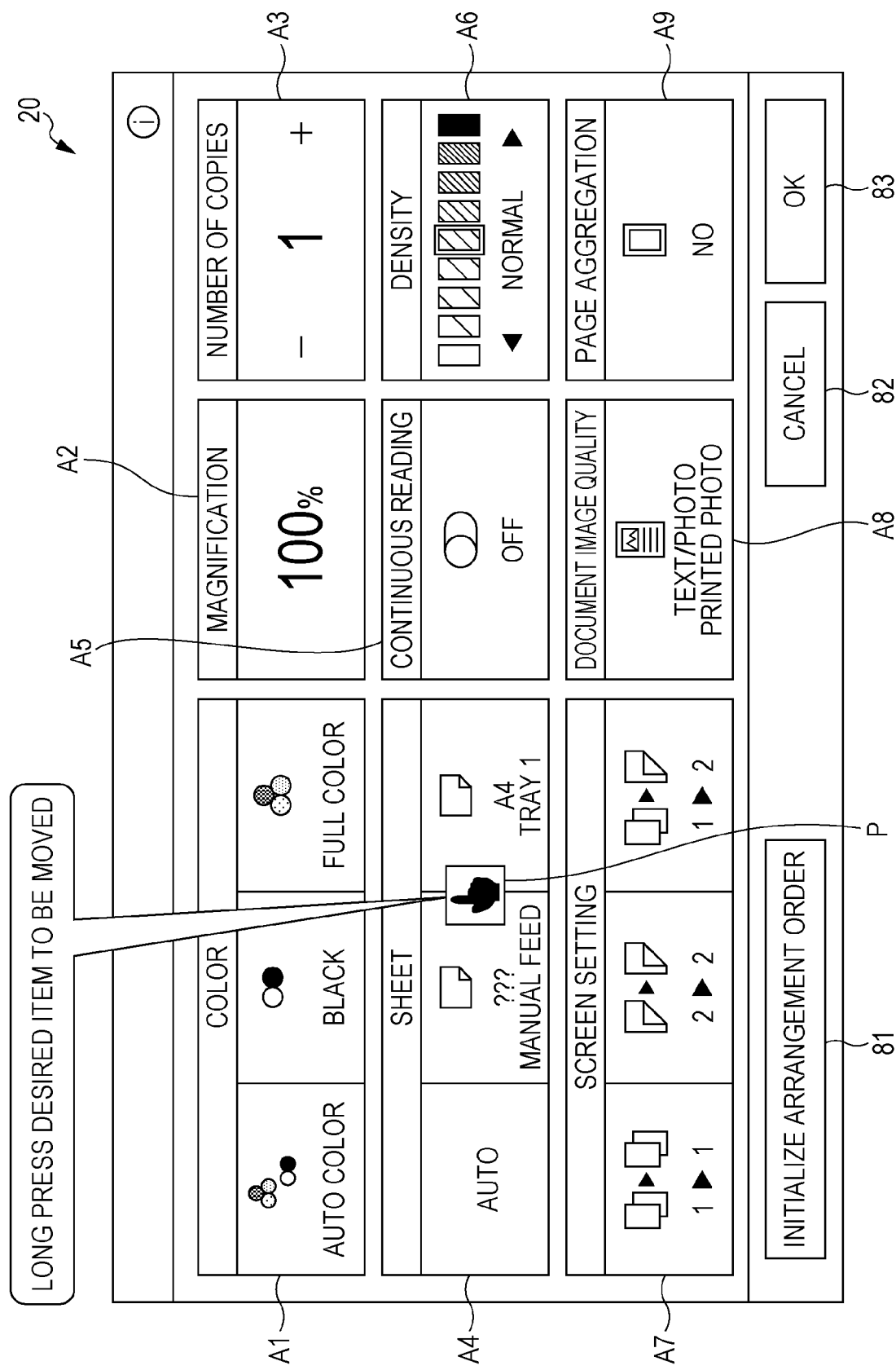
FIG. 3 is a diagram illustrating a default display state of a copy setting screen displayed on a display unit of the image forming apparatus, and describing a case where a customizing operation of an icon arrangement is performed.

FIG. 3 is a diagram describing arrangement of various icons (icons A1 to A9 in this example) on the display screen (initial display mode of a copy setting screen in this example) displayed on the operation display unit 20 (display unit 21) of the image forming apparatus 1, and basic operation for customizing icons.

In the example illustrated in FIG. 3, from the left side of the first row from the top in the display screen, a "color" icon A1 for selecting black and white, color copy, or the like, a "magnification" icon A2 for specifying the copy magnification, and a "number of copies" icon A3 for specifying the number of copies are arranged in a horizontal row.

Further, in the second row from the top, from the left, a "sheet" icon A4 for setting the size of output paper, a "continuous reading" icon A5 for selecting whether or not to continuously read the document, and a "density" icon A6 for setting (selecting) output density of copy are arranged in a horizontal row.

Furthermore, in the third row from the top, from the left side, a "double-sided setting" icon A7 for making settings related to single-sided or double-sided printing, a "document image quality" icon A8, and a "page aggregation" icon A9 for selecting whether or not to perform aggregation printing such as what is called a 2-in-1 or 4-in-1 are arranged in a horizontal row.

Note that in the example illustrated in FIG. 3, an "initialize arrangement order" switch 81, a "cancel" switch 82, and an "OK" switch 83 are displayed as other icons or switches, but since they are not targets of replacement and have similar functions to conventional ones, the detailed description thereof will be omitted.

For example, on the "sheet" icon A4, when the area on the left side where characters of "automatic" are displayed (hereinafter, also referred to as "button" for convenience) is touched (short pressed) with a finger or the like, the controller 100 determines (sets) the size of the sheets S to be fed by referring to the above-described size of document D, setting of the "magnification" icon A2, and the like.

Note that, in practice, the above-described determination (setting) by the controller 100 is executed after the above-mentioned "OK" switch 83 is pressed by the user, and the same applies to the following items.

Further, when the "??? Manual Feed" button at the center of the "sheet" icon A4 is touched (short-pressed) with a finger or the like, the controller 100 sets sheets S to be fed to sheets placed on the manual feed tray (see the side of a right side surface in FIG. 1). Moreover, when the "A4 tray 1" button on the right side of the "sheet" icon A4 is touched (short pressed) with a finger or the like, the controller 100 sets the sheets S to be fed to the A4 size sheet loaded on a tray 1 (for example, the tray unit 51a in FIG. 1).

Note that basic functions of other icons (A1 to A3, A5 to A9), for example, increasing the displayed set number of copies stepwise as 2, 3 . . . by touching the position of "+" in the "number of copies" icon A3, and the like are similar to those of a general commercial copier and have little relevance to one or more embodiments of the present invention, and thus the description thereof will be omitted.

On the other hand, when an operation (generally called a "long press") is performed in which an arbitrary area of any icon (A1 to A9) is kept pressed down for a predetermined time (for example, about two to three seconds), the controller 100 recognizes (specifies) the long-pressed icon (any of A1 to A9) as a "movement source icon".

Then, the controller 100 changes to a mode (hereinafter referred to as a customization mode) for moving the specified movement source icon to an arbitrary position desired by the user on the display screen to rearrange the icons (replacement of display position) with each other.

In order to avoid complicating the description, in the example described below, the "sheet" icon A4 is exclusively recognized (specified) as the movement source icon, and a case where the display positions (arrangements) of the "sheet" icon A4 and the "continuous reading" icon A5 are replaced will be described.

Note that in order to facilitate understanding, in FIG. 3 and so on, operations performed by the user and changes in display contents are described in balloon frames.

Figure 4:
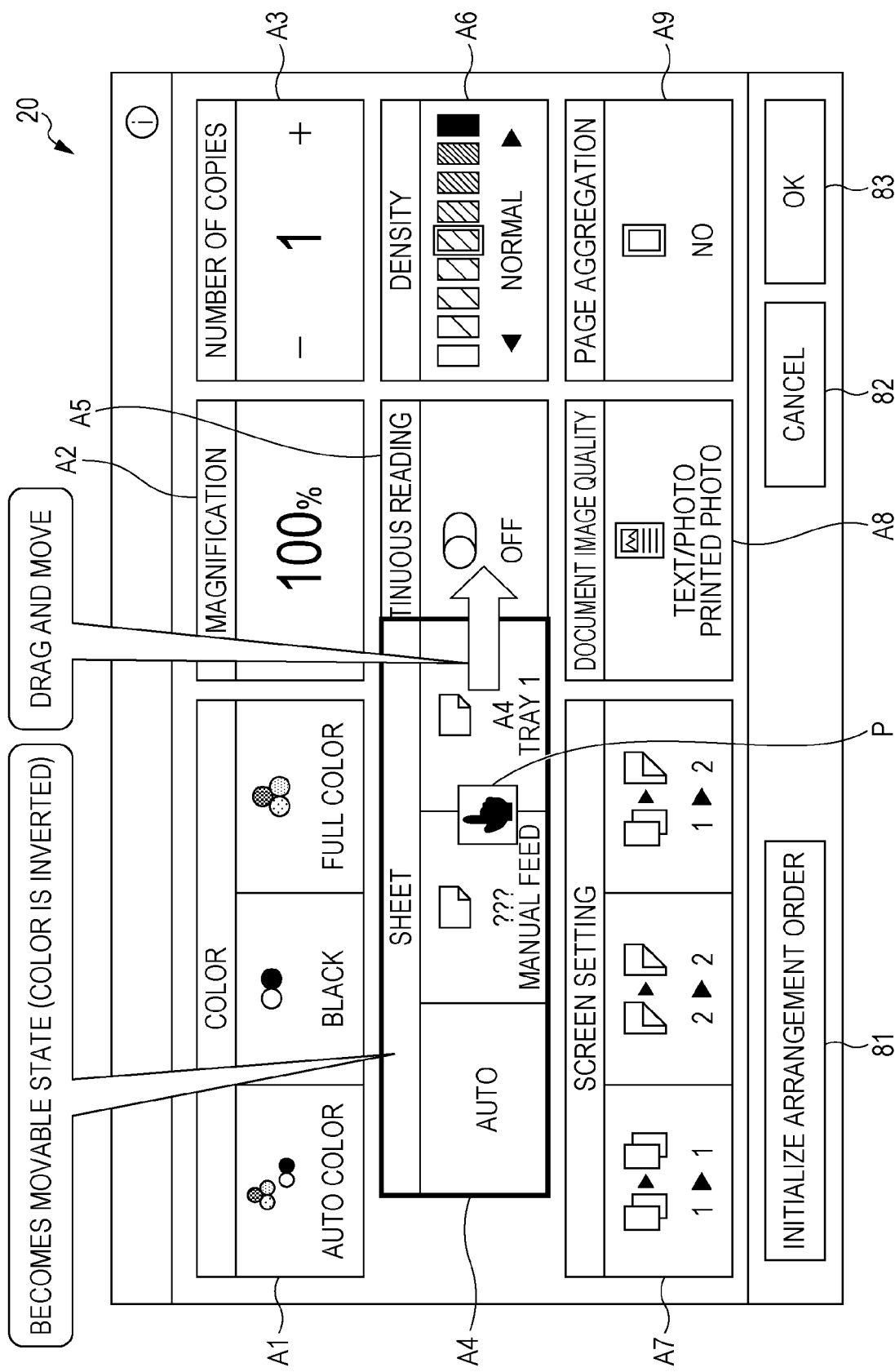
FIG. 4 is a diagram illustrating an example of an operation state at a start of movement when a "sheet" icon is moved rightward based on a touch operation by a user from the display state illustrated in FIG. 3.
Figure 5:
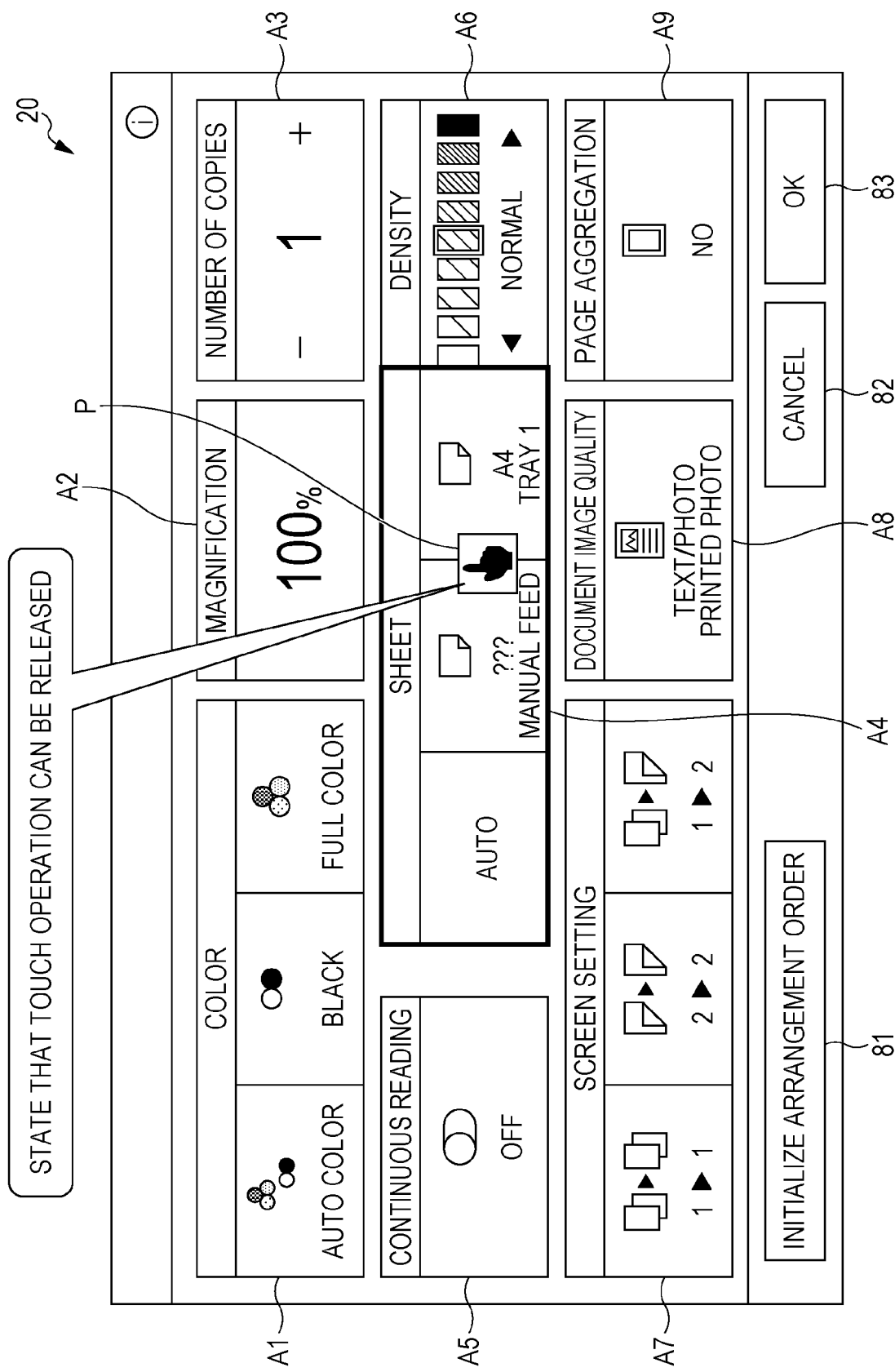
FIG. 5 is a diagram illustrating an example of an operation state when the "sheet" icon is further moved rightward from a display state illustrated in FIG. 4 and the finger is released.

Furthermore, for ease of understanding, in FIGS. 3 to 5, a touch position P that the user has touch-operated (long-pressed and dragged) with a finger is indicated by the "right index finger" icon, but such an icon will not actually be displayed. However, it may be formed to display an icon indicating the touch position P.

Thus, the controller 100 specifies the long-pressed icon ("sheet" icon A4 in the example of FIG. 3) as the movement source icon based on the operation signal output by the operation display unit 20.

At this time, the controller 100 performs processing (color change control) of changing the color of the icon (A4) specified as the movement source icon to a color different from the color in the initial state, so as to notify the user that the icon has become movable (see the balloon section on the left in FIG. 4).

Subsequently, the controller 100 specifies the direction in which the icon specified as the movement source icon (here, the "sheet" icon A4) is dragged (moved). In this example, it is presumed that a drag operation is performed such that the finger of the user moves rightward indicated by an arrow in FIG. 4.

At this time, the controller 100 outputs a display control signal to the operation display unit 20 so as to move the movement source icon ("sheet" icon A4) rightward according to the drag operation. With such control, among the plurality of icons displayed on the display screen, only the "sheet" icon A4 is displayed so as to move rightward (see FIG. 4).

Subsequently, when the controller 100 detects that the touch position P in the movement source icon ("sheet" icon A4) enters the predetermined area of the "continuous reading" icon A5 (corresponding to a "movement destination icon") located next to it, as illustrated in FIG. 5, the controller 100 outputs a display control signal to the operation display unit 20 so as to move the "continuous reading" icon A5 to the left side (that is, the position where the movement source icon is displayed).

By changing the display mode based on such control, the user intuitively knows that the rearrangement of the movement source icon and the desired movement destination icon is completed, and that the series of touch operations may be finished. Therefore, the user releases the finger from the "sheet" icon A4 in order to release the operation (drag) from the state illustrated in FIG. 5, for example.

Figure 6:
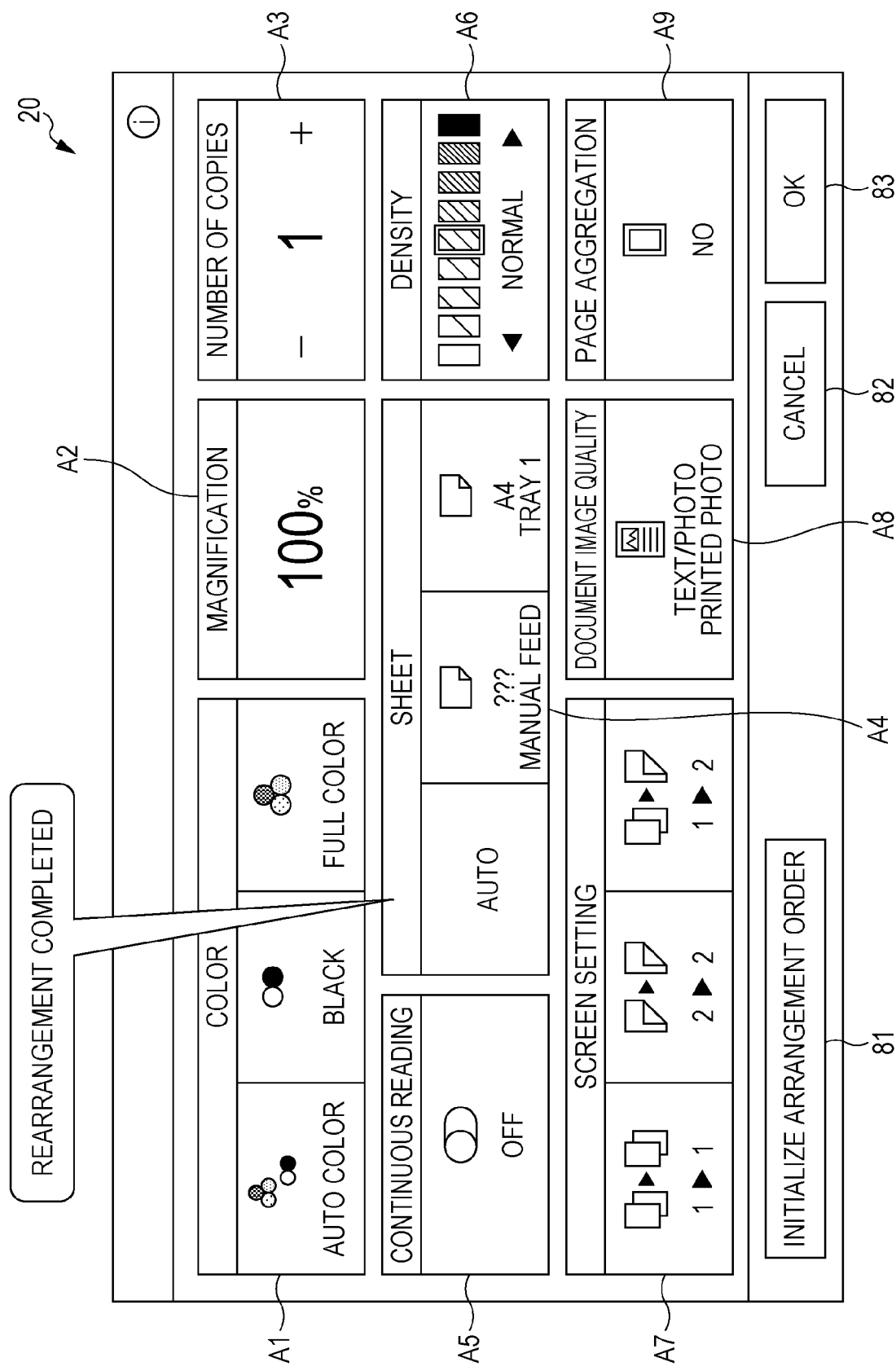
FIG. 6 is a diagram illustrating a display state after a long press is released by releasing the finger of the user from the display state illustrated in FIG. 5.

Here, when the controller 100 detects that the operation (drag) by the user on the "sheet" icon A4 is released, the controller 100 outputs a display control signal to the operation display unit 20 so as to display the "sheet" icon A4 at the correct position of the movement destination (see FIG. 6) and finishes the "customization mode".

As described above, the controller 100 controls movement display of the icons (A4, A5) according to the touch operation on a first icon ("sheet" icon A4 in this example) that becomes the "movement source icon" among the plurality of icons displayed within the display screen of the operation display unit 20, so as to replace the display positions of the first icon and a second icon that becomes the "movement destination icon" ("continuous reading" icon A5 in this example).

Thus, in correspondence with one or more embodiments of the present invention, the operation display unit 20 corresponds to an "operation receiver" that receives an operation (touch operation of the user) of selecting and moving a part of a plurality of icons (images) displayed on the display screen as the movement source icon.

Further, when the above operation (touch operation by the user) is received, the operation display unit 20 and the controller 100 function as a "display position changer" that performs processing of changing the display position of the movement source icon on the display screen, and further processing of movement display of moving the movement destination icon present at the movement destination of the movement source icon to a position where the movement source icon has been displayed.

Note that further functions of the "display position changer" will be described later.

Figure 7A:
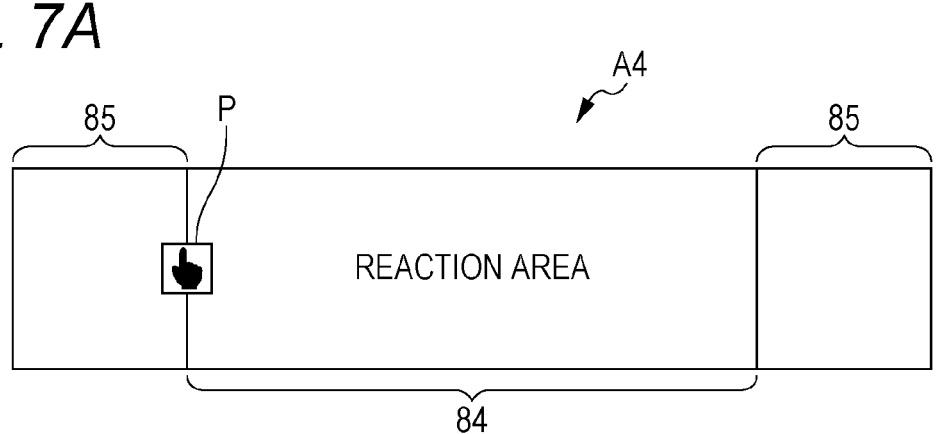
FIGS. 7A and 7B are diagrams describing a reaction region and a non-reaction region in two types of icons illustrated in FIG. 3 and the like, FIG. 7A illustrating a reaction region and the like in a large icon, and FIG. 7B illustrating a reaction region and the like in a small icon.
Figure 7B:
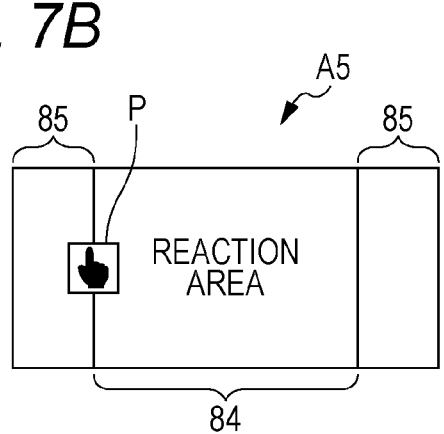

On the other hand, FIGS. 7A and 7B are diagrams illustrating a comparison of a reaction region 84 and the non-reaction region 85 in the above-described "sheet" icon A4 and "continuous reading" icon A5. Here, the reaction region 84 is a region that can react (sense or detect) to arrival of a finger (heat source or pressurization source) touching (dragging) the movement source icon.

On the other hand, the non-reaction region 85 is a region that cannot react (detect, or the like) to arrival of a finger (heat source or pressurization source) touching (drag) the movement source icon. That is, the reaction region 84 and the non-reaction region 85 indicate the function of the "movement destination icon". On the other hand, with respect to the "movement source icon", the touch (drag) position can be specified (detected, or the like) by touching (dragging) any part of the icon.

Thus, as illustrated in FIGS. 7A and 7B, it can be seen that both of the large icon "sheet" icon A4 and the "continuous reading" icon A5, which has half the width of such an icon, have the reaction region 84 on a center side, and the non-reaction regions 85 on both the left and right sides of the reaction region 84.

Further, referring to FIGS. 5 and 7B described above, in the above example, while the position P of the finger performing the drag operation of the "sheet" icon A4 is in the non-reaction region 85 on the left side of the "continuous reading" icon A5, a change in the display position of the movement destination icon (movement of the "continuous read" icon A5) has not yet occurred.

Then, in the above example, when the position P of the finger of the user performing the drag operation of the movement source icon ("sheet" icon A4) enters the reaction region 84 of the movement destination icon ("continuous reading" icon A5), the display position of the movement destination icon is changed.

Note that when the position P of the finger enters the reaction region 84 of the "concentration" icon A6 without the user releasing the drag operation from the state illustrated in FIG. 5, the movement destination icon (in this case, the "concentration" icon A6) also moves to the left and the display position is changed.

However, according to such a conventional configuration, the timing of movement of the "continuous reading" icon A5 differs depending on the touch position P of the movement source icon ("sheet" icon A4), and operating feeling of the user changes.

Hereinafter, this phenomenon will be described in more detail with reference to FIG. 8A and so on.

Figure 8B:
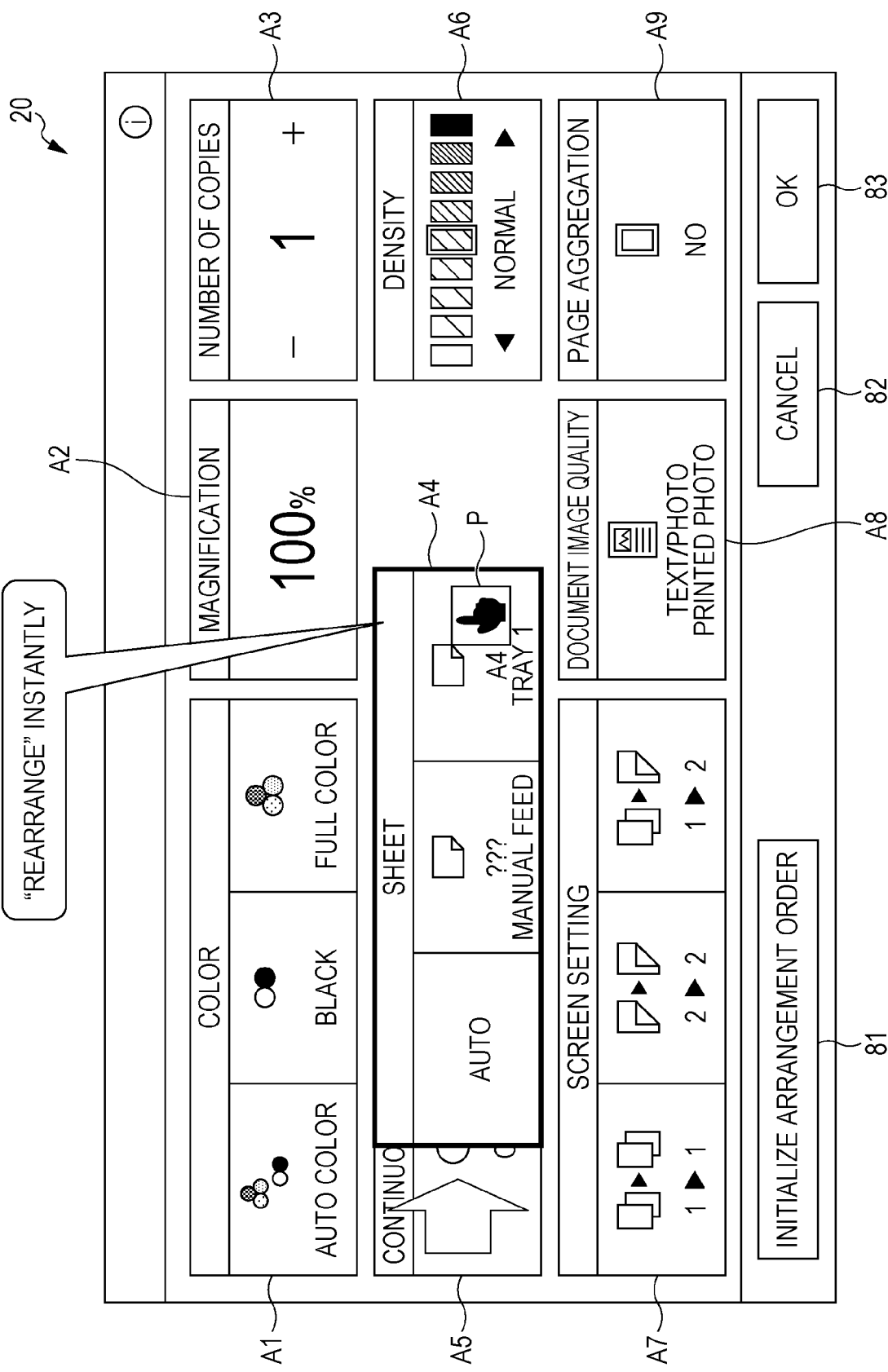

FIGS. 8A and 8B are diagrams describing a state at an operation start time and during movement display control when a right end side of the "sheet" icon A4 is touch-operated (long-pressed and dragged) from the display state illustrated in FIG. 3 and rearranged with the "continuous reading" icon A5.

As can be seen by referring to FIGS. 7B and 8B described above, in a case where the right end side of the "sheet" icon A4 is touched, at a timing when the right end of the "sheet" icon A4 comes near the center of the "continuous reading" icon A5, the "continuous reading" icon A5 moves to the left and these icons are rearranged.

Figure 9A:
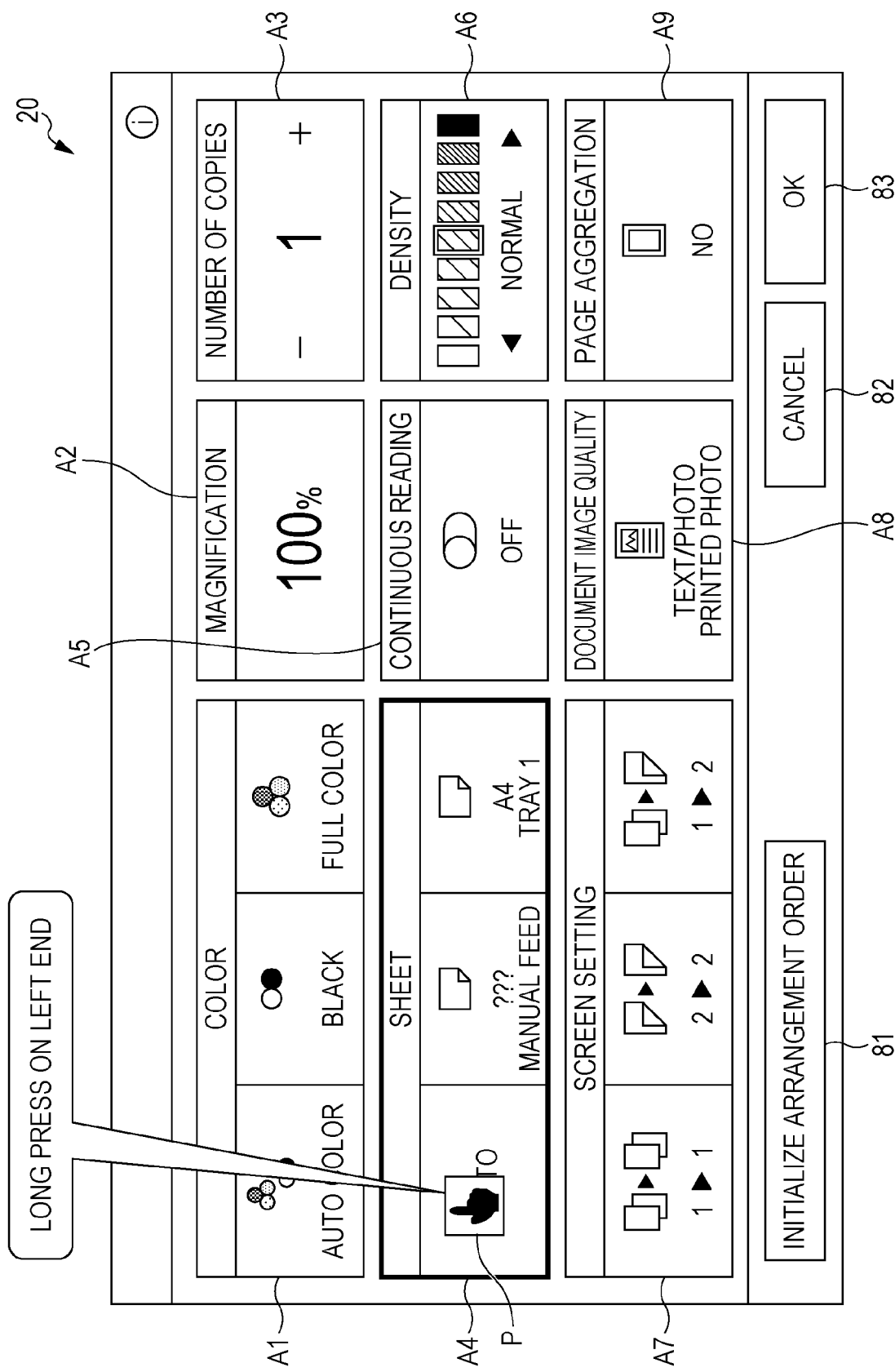

On the other hand, as illustrated in FIG. 9A, when the left end side of the "sheet" icon A4 is touched-operated (long pressed and dragged) in the display state illustrated in FIG. 3 in order to rearrange with the "continuous reading" icon A5, even if the right end of the "sheet" icon A4 comes near the center of the "continuous reading" icon A5, the display position of the "continuous reading" icon A5 still does not move.

That is, in this case, as illustrated exaggerated in FIG. 9B, when the right end of the "sheet" icon A4 passes the "density" icon A6, which is not the movement destination icon, and moves to a position projecting outside of the display screen, the "continuous reading" icon A5 finally moves to the left, and the rearrangement (replacement) of these icons can be completed.

Thus, as can be seen by comparing FIG. 8B and FIG. 9B, when rearranging with the "continuous reading" icon A5, it can be seen that the timing at which the "continuous reading" icon A5 moves to the left, and moreover, the operating feeling of the user change completely between when touch-operating the right end side of the "sheet" icon A4 and when touch-operating the left end side.

It can be seen that such a difference in operating feeling based on a difference in touch position (touch coordinates of a long-pressed position) in the icon occurs based on a difference in the amount of movement of the icon, that is, the amount of drag work of the user. Further, it is conceivable that the above-mentioned difference in operating feeling leads to occurrence of stress of the user, operation error, and the like.

Here, as the stress of the user, in the above-mentioned case examples in FIGS. 9A and 9B, there is a case where the movement destination icon ("continuous reading" icon A5) does not move at all and causes an anxiety that "it may be a malfunction" or the like.

In addition, in the case examples described above in FIGS. 9A and 9B, it is expected that the user worries if "the 'concentration' icon A6 that is not originally desired to move moves", and such worry can also be a large psychological burden.

Moreover, due to the above-mentioned concerns or worries, there may be a case where the user gives up the work of rearranging the icons in the middle.

As one measure to deal with the difference in operating feeling, it is conceivable to increase the occupied area of the above-described reaction region 84 in each icon as much as possible and reduce the area of the non-reaction region 85.

However, with such a configuration, even if the difference in operating feeling based on the difference in touch position on the movement source icon can be reduced to some extent, the difference in the amount of movement of the icon, that is, the amount of drag work by the user still exists, and thus it is conceivable that no remarkable effect can be obtained.

As a result of diligent studies, the present inventors have provided a configuration as follows in order to eliminate the difference in operating feeling during the operation of rearranging icons.

That is, the controller 100 and the operation display unit 20 in one or more embodiments, as a further function of the above-described "display position changer", perform the above-described control of movement display of a plurality of icons assuming that the touch position on the movement source icon is a predetermined first position in the icon, regardless of the touch position in the touch operation to the movement source icon.

More simply, in one or more embodiments, the controller 100 and the operation display unit 20, after receiving an operation of the user to select and move a part of the plurality of icons (A1 to A9) in the display screen as the movement source icon, change the display position of the movement source icon assuming that the first position of the movement source icon is selected on the display screen.

Then, the controller 100 and the operation display unit 20 in one or more embodiments perform the processing of movement display of moving the movement destination icon present at the movement destination of the movement source icon to the position where the movement source icon has been displayed based on the moving direction of the movement source icon. Such processing of movement display is only required to be performed when the movement source icon reaches a predetermined position in the display screen (for example, a predetermined area in the movement destination icon). By such processing, it is possible to eliminate or significantly reduce the sense of discomfort that has been conventionally generated during the operation of rearranging icons.

The above "first position" is not particularly limited as long as it is a position within the touched movement source icon, and may be any position. This is because, specifically, if the first position is determined, "unification of operating feelings" can be performed when the operation of rearranging the icons is performed.

Therefore, as the "first position", for example, the user may be allowed to specify or select an arbitrary position (for example, a center position of each icon, a position where the drag operation amount is minimized, or the like) through a setting screen, which is not illustrated.

On the other hand, from the viewpoint of ensuring a wide moving direction of the movement source icon, in the initial setting (default state of the image forming apparatus 1), the "first position" is only required to be a center position in a direction in which rearrangement (replacement) is possible in each icon (icons A1 to A9 in this example).

Figure 11A:
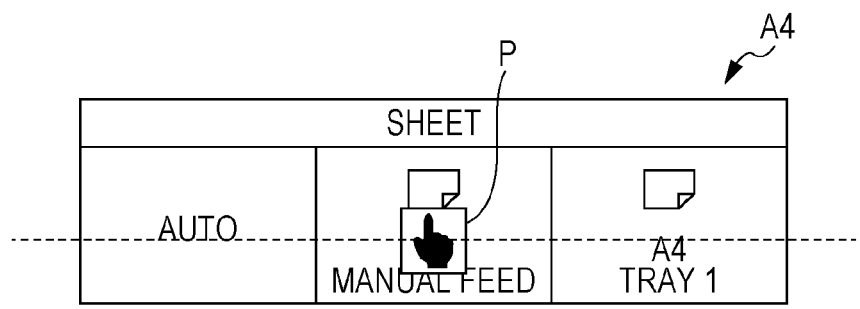
FIGS. 11A to 11C are diagrams describing an example of correcting a display position of a movement source icon according to a direction in which the movement source icon is moved.
Figure 11B:
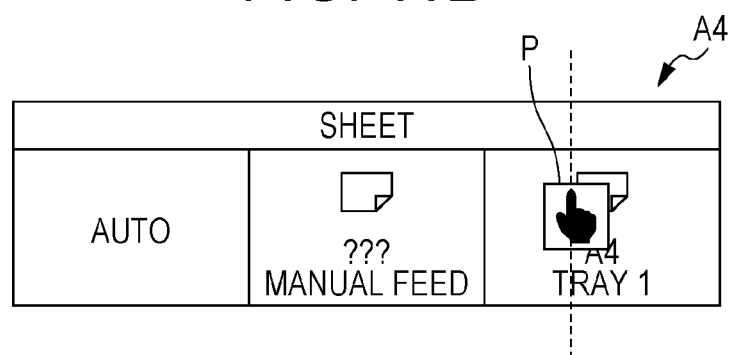
Figure 11C:
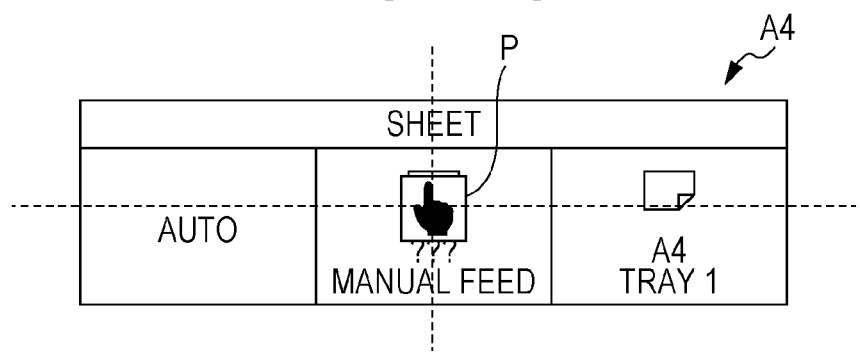

Specifically, in this example, an arbitrary icon A1 to A9 displayed in the display screen can be replaced with other icons (A1 to A9) in the lateral (left-right) direction and the longitudinal (up-down) direction, and thus it is conceivable that the "first position" is the center position of each icon (A1 to A9) in the lateral and longitudinal directions (see FIG. 11C as appropriate).

Alternatively, when the direction of the icon to be rearranged with the icon can already be specified when the arbitrary icon is long-pressed, for example, when the moving direction of the icon is detected after the icon is long-pressed (after the customization mode is started), the "first position" may be a center position in the moving direction of the icon. Note that details of this example will be described later in FIGS. 10A to 10E and 11A to 11C.

Hereinafter, specific examples of detailed control contents and display operations, and the like related to the above-described characteristic functions will be described with reference to FIGS. 10A to 10E. Note that for the sake of simplicity, respective pictures of the icons (A1 to A9) displayed on the display screen and the signs of icons and the like that are not to be moved are appropriately simplified or omitted in FIGS. 10A to 10E.

Here, FIG. 10A illustrates a diagram corresponding to FIG. 8A described above, that is, a diagram at the start of an operation when the right end side of the "sheet" icon A4 is touch-operated (long-pressed). On the other hand, FIG. 10C illustrates a diagram corresponding to FIG. 9A described above, that is, a diagram at the start of operation when the left end side of the "sheet" icon A4 is touched (long-pressed).

In one or more embodiments, when the controller 100 detects that any icon ("sheet" icon A4 in this example) is long-pressed at the touch position P, the controller 100 changes to the "customization mode" and specifies the long-pressed icon (A4) as the movement source icon.

Subsequently, the controller 100 monitors the operation signal output from the operation display unit 20, and specifies the moving direction (that is, the replacement direction) of the icon ("sheet" icon A4) that has been long-pressed and specified as the movement source icon.

Then, when the controller 100 specifies the moving direction (replacement direction) of the icon (A4), the controller 100 assumes the touch position on the touched icon (A4) as the "first position" in the touched icon (A4), regardless of the touch position (P) in the touch operation described above.

In one specific example, the "first position" is the center position ("first position") of the icon specified as the movement source icon in the moving (replacement) direction.

More specifically, in the case examples illustrated in FIGS. 10A, 10C, and the like, the controller 100 can specify or predict that the icon A4, which is the movement source icon, is moved rightward and replaced with another icon on the right side. Therefore, the controller 100 considers that the touch position (P) of the user on the icon A4 is the center position ("first position") in the left-right direction in the icon A4, and controls the movement display of the icon A4.

That is, the controller 100 outputs to the operation display unit 20 a control signal indicating to move (to correct the display position of) the icon (icon A4) in the horizontal direction so that the touch position P currently touched by the user is in the center of the movement source icon (icon A4).

According to such control, when the right end side of the icon A4 is touched (long-pressed) by the user, the right end of the icon A4 moves horizontally (see also FIG. 11A as appropriate) to a position that overlaps a large portion of the above-described "continuous reading" icon A5 (hereinafter referred to as the movement destination icon A5) as illustrated in FIG. 10B.

At this time, since the touch position P, that is, the position of the finger of the user (heat source or pressing source) remains unchanged, movement (change of display position) of the movement destination icon A5 is not performed, and moreover, rearrangement of the both icons (A4, A5) is not performed until the touch position P enters the reaction region 84 (see FIG. 7B) of the movement destination icon A5.

On the other hand, when the left end side of the icon A4 (movement source icon) is touched (long-pressed) by the user, the left end of the icon A4 moves to a position projecting outside of the display screen as referred to in FIGS. 10C and 10D (see also FIG. 11A as appropriate). Note that FIG. 10D is illustrated schematically for the sake of easy understanding, and the left side of the icon A4 (portion projecting from the display screen) cannot be displayed in practice.

On the other hand, since the touch position P, that is, the position of the finger of the user (heat source or pressing source) remains the same in this case as well, movement of the movement destination icon A5 (change of the display position), and moreover, rearrangement of both the icons (A4, A5) are not performed until the touch position P enters the reaction region 84 (see FIG. 7B) of the movement destination icon A5.

FIG. 10E illustrates that, as a result of the touch position P entering the reaction region 84 (see FIG. 7B) of the movement destination icon A5 by the user performing a drag operation of moving the finger to the right from the state illustrated in FIG. 10B or 10D, movement of the "continuous reading" icon A5 (rearrangement of both the icons (A4, A5)) is performed.

As described above, according to one or more embodiments, even when the touch position P is located at any position from the right end side to the left end side of the movement source icon ("sheet" icon A4), rearrangement of both the icons (A4, A5) can be performed by moving the movement source icon ("sheet" icon A4) by a certain amount.

More specifically, in one or more embodiments, by adding processing of displaying the center part (first position) of the movement source icon (A4) so as to match the touch position P, the timing (movement amount of the movement source icon) at which rearrangement of both the icons (A4, A5) is performed can be made constant (unified) regardless of the location of the touch position P in the movement source icon (A4).

Therefore, according to one or more embodiments, it is possible to eliminate differences in the amount of operation due to differences in the touch position P at the time of the arrangement changing operation of the icons (A1 to A9), and to unify the operating feeling of the user.

Hereinafter, details of the above-mentioned control of the movement display (correction of the display position) regarding the movement source icon (A4) will be described with reference to FIGS. 11A to 11C.

FIG. 11A corresponds to the case examples of FIG. 10B or 10D and FIG. 10E, and illustrates a case where, when the moving direction, that is, the rearrangement with the movement destination icon A5 is in the horizontal direction (right or left lateral direction), the display position of the movement source icon (A4) is moved (corrected) in the horizontal direction so as to match the touch position P.

Note that although not illustrated, such a movement (correction) mode of the display position of the movement source icon (A4) can also be applied when performing rearrangement of desired icons by using a display screen such that a plurality of icons is displayed side by side in a horizontal row.

Alternatively, although the mode of the above-described movement (display position correction) of the movement source icon (A4) is a display screen in which a plurality of n lateral and m longitudinal icons is arranged and displayed, for example, similarly to the screen illustrated in FIG. 3, it can also be applied when rearrangement in the longitudinal direction is prohibited due to the reason that the types and sizes of m longitudinal icons are significantly different from each other, or the like.

That is, in the case as described above, since the replacement of icons occurs only in the horizontal (lateral) direction and cannot occur in the vertical (longitudinal) direction, the controller 100 can control the movement (display position correction) of the movement source icon without performing processing of specifying the moving direction (see a dotted line extending in the horizontal direction in FIG. 11A).

FIG. 11B is a diagram for supplementary description of a case example other than the above-described cases, and illustrates a case where, when the moving direction, that is, the rearrangement with the movement destination icon is in the vertical direction (up or down longitudinal direction), the display position of the movement source icon (A4) is moved (corrected) in the vertical (up or down) direction.

The case example illustrated in FIG. 11B illustrates a case where, for example, from the initial state of the display screen (see FIG. 3), a touch (long press) operation is performed at a position closer to the right side in the movement source icon (A4) (see the touch position P), and an upward or downward drag operation is started.

In this case, the controller 100 determines that the moving direction (rearrangement of each icon) of the movement source icon is up (or down), and controls to perform movement display (correction) so that a center position of the movement source icon (A4) in the up-down direction matches the touch position P (see a dotted line extending in the vertical direction in FIG. 11B).

Note that although not illustrated, such a movement (correction) mode of the display position of the movement source icon (A4) can also be applied when performing rearrangement of desired icons by using a display screen such that a plurality of icons is displayed side by side in a longitudinal row.

Alternatively, although the mode of the above-described movement (display position correction) of the movement source icon is a display screen in which a plurality of n lateral and m longitudinal icons is arranged and displayed, for example, similarly to the screen in FIG. 3, it can also be applied when rearrangement in the lateral direction is prohibited due to the reason that the types and sizes of n horizontal icons are significantly different from each other, or the like.

That is, in the case as described above, since the replacement of icons occurs only in the vertical (longitudinal) direction and cannot occur in the horizontal (lateral) direction, the controller 100 can control the movement (display position correction) of the movement source icon without performing processing of specifying the moving direction (see a dotted line extending in the vertical direction in FIG. 11B).

FIG. 11C is a diagram describing control to perform movement (correction) so that the display position of the movement source icon (A4) in a case where the movement source icon (A4) is rearranged with another icon in a diagonal direction within the display screen, that is, in the left-right direction and the up-down direction matches the touch position P.

The case example illustrated in FIG. 11C is applied when, for example, a drag operation to an upper right is started so as to perform rearrangement with the icons A2 and A3 after a touch (long press) operation is performed, for example, at an arbitrary position in the movement source icon A4 from the initial state of the display screen illustrated in FIG. 3.

Note that although not illustrated, such movement (correction) mode of the display position of the movement source icon (A4) may be applied when desired rearrangement of icons is performed using a display screen in which a plurality of icons is arranged and displayed in an "x" shape.

That is, in the case as described above, since the replacement of icons occurs diagonally, that is, in the horizontal component and vertical component directions (only), the controller 100 can control the movement (display position correction) of the movement source icon without performing processing of specifying the moving direction (see two dotted lines extending in biaxial directions in FIG. 11C).

In this case, the controller 100 determines that the moving direction (rearrangement) is diagonal, that is, right (or left) and up (or down), and controls to perform movement display (correction) so that an up-down and left-right center position (that is, a center part in the horizontal direction and vertical direction) of the movement source icon (A4) matches the touch position P.

As described above, by performing the processing (control) of correcting so that the display position of the movement source icon matches the touch position P, the user can immediately grasp (intuitively recognize) "how much more drag operation needs to be performed". Therefore, according to one or more embodiments, it is possible to eliminate or significantly reduce the stress, sense of discomfort, and the like of the user, which have been conventionally generated during the operation of rearranging icons.

Figure 12:
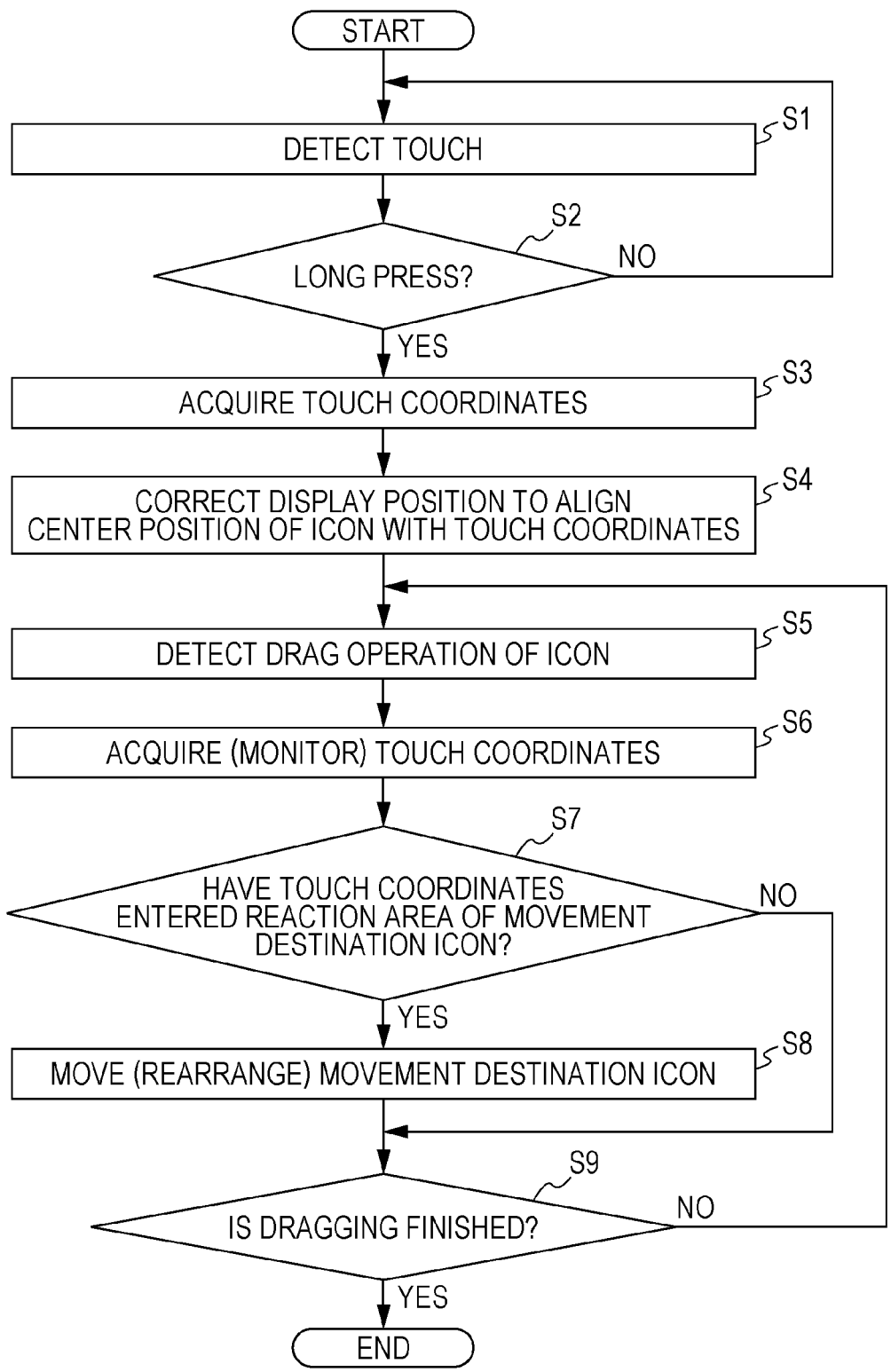
FIG. 12 is a flowchart describing a flow of processing related to rearrangement of icons in one or more embodiments.

Next, one specific example of a flow of processing performed by the controller 100 regarding the rearrangement of icons in one or more embodiments will be described with reference to a flowchart of FIG. 12.

When the controller 100 detects that any of the icons (A1 to A9) is touched during the display of the display screen described above in FIG. 3 or the like (step S1), the controller 100 determines that a touch by the finger of the user or the like is started and proceeds to step S2.

In step S2, the controller 100 determines whether or not the touch is a long press. Such a determination is based on whether or not the touch on any of the icons (A1 to A9) is continued for a predetermined time (for example, two seconds).

Here, when the controller 100 determines that the touch on any of the icons (A1 to A9) is not continued for a predetermined time (for example, two seconds) (step S2, NO), the controller 100 determines that the long press is not performed, and the process waits until it is detected again that step S1, that is, one of the icons (A1 to A9) is touched.

Note that, in practice, when the controller 100 determines NO in step S2, the controller 100 determines that the touch on the icon (A1 to A9) is a short press and performs setting or the like corresponding to the short press, but since such processing is irrelevant to features of one or more embodiments and is similar to conventional one, the description thereof will be omitted.

On the other hand, when the controller 100 determines that the touch on any of the icons (A1 to A9) is continued for a predetermined time (for example, two seconds) (step S2, YES), the controller 100 proceeds to step S3.

In the following, it is presumed that the "sheet" icon A4 is long-pressed as described above for convenience and simplicity of explanation, but similar processing will be performed when other icons are long-pressed. Further, for convenience, the "sheet" icon A4 will be hereinafter referred to as the movement source icon A4 as appropriate.

In step S3, the controller 100 acquires touch coordinates of the touch position P, which is a long press, that is, two-dimensional coordinate positions (x0, y0) in the display screen of the display unit 21.

In subsequent step S4, the controller 100 performs processing of correcting the display position of the movement source icon A4 so as to align (match) the center position (first position) of the touched movement source icon A4 with the touch coordinates (x0, y0).

Subsequently, when a drag operation to the movement source icon A4 is detected (step S5), the controller 100 proceeds to step S6.

In step S6, the controller 100 continuously monitors or acquires the touch coordinates of the touch position P during the drag operation, that is, the two-dimensional coordinate positions (x1, y1) in the display screen of the display unit 21, and proceeds to step S7.

In step S7, the controller 100 determines whether or not the touch coordinates (x1, y1) of the touch position P have entered the reaction region 84 of any other icon (movement destination icon) within a predetermined time (for example, within 20 seconds).

Here, when it is determined that the touch coordinates (x1, y1) of the touch position P have entered the reaction region 84 of the movement destination icon (for example, the "continuous reading" icon A5) within the predetermined time (step S7, YES), the controller 100 proceeds to step S8.

On the other hand, when it is determined that the touch coordinates (x1, y1) of the touch position P have not entered the reaction region 84 of the other icon (movement destination icon) within the predetermined time (step S7, NO), the controller 100 determines that the user has given up the rearrangement, and skips step S8 to proceed to step S9.

In step S8, the controller 100 causes the operation display unit 20 to move the display position of the movement destination icon (for example, "continuous reading" icon A5) to the position where the movement source icon A4 has been displayed (movement source area) in order to rearrange the target icons. In this manner, the movement source icon A4 and the movement destination icon are rearranged (display positions are replaced).

In step S9, the controller 100 determines whether or not the dragging of the moving source icon A4 is finished (whether the finger is released) within a predetermined time (for example, within five seconds) from the time of the determination in step S7.

Here, when the controller 100 determines that the dragging has not been completed within the predetermined time (within five seconds) (the finger has not been released from the "sheet" icon A4) (step S9, NO), the controller 100 determines that the user is wondering which position to rearrange. In this case, the controller 100 monitors the touch position P on the movement source icon A4 and repeats the processes of step S5 and so on described above.

On the other hand, when the controller 100 determines that the dragging is completed (the finger is released from the movement source icon A4) within the predetermined time (within five seconds) (step S9, YES), the controller 100 performs the processing of appropriately correcting the display position of the original icon A4 as described above, and thereafter finishes the series of processes (customization mode).

According to one or more embodiments in which the control as described above is performed, operating feelings at the time of an arrangement change operation of the icons (A1 to A9) can be unified without changing the basic configuration of the conventional operation display unit 20.

Note that in the above-described embodiments, as an example of the processing of "assuming the touch position (P) on the touched icon (A4) as the predetermined first position in the icon (A4) regardless of the touch position (P) in a touch operation on a movement source icon (A4)", the following is presumed.

That is, the controller 100 performs the processing of changing (correcting) the display position of the icon so that the first position of the movement source icon (A4) matches the touch position (P) of the user as an example of the above "assumption" processing. Hereinafter, for convenience of description, a configuration for performing such processing will be referred to as a "first configuration".

On the other hand, the present invention is not limited to the above-described example, and as another example of the above "assumption" processing, a "second configuration" for performing processing as follows may be selectively employed.

That is, the controller 100 performs processing of "replacement reading of the coordinates" in which the two-dimensional coordinate position (xt, yt) of the touch position P of the movement source icon (A4) detected by the operation display unit 20 is substituted in the center of the currently displayed movement source icon (A4), that is, the first position (x1, y1) as replacement reading.

More simply, in the "customization mode", the controller 100 assumes as if the touch operation is performed at the first position (center part) of the movement source icon (A4) regardless of the actual position where the touch operation (long press and drag) is performed in the movement source icon (A4).

In this case, the controller 100 does not correct the display position of the movement source icon (A4) described above in step S4, monitors the operation signal supplied from the operation display unit 20, and performs control to change the display position of the icon (A4) according to the drag operation by the user, as conventionally performed.

Then, when the first position of the movement source icon (A4) whose display position changes according to the drag operation comes to the predetermined position of the movement destination icon (A5), for example, when it enters the reaction region 84 illustrated in FIG. 7B, the controller 100 performs control (processing of movement display) to change the display position of the movement destination icon (A5) to the area (initial position) where the movement source icon (A4) has been displayed.

Processing of such "second configuration" is only required to be performed particularly when the touch position P is a position as described in FIGS. 9A and 9C (conventionally, a position where the drag operation amount is enlarged).

In general, regarding the operation of rearranging the icons, in the first configuration, the operation amount of the drag operation is the same as the conventional one, whereas the second configuration is different in that the operation amount of the drag operation changes depending on the touch position (P).

On the other hand, both the first and second configurations have a common point of obtaining the effect of changing the display position of the movement destination icon (A5) (rearrangement is substantially started) when the first position (center position in this example) of the movement source icon (A4) that is moved (display position is changed) according to the drag operation reaches the predetermined position in the display screen (the reaction region 85 of the movement destination icon (A5) in this example).

In general, one or more embodiments of the present invention include an "operation receiver" that receives an operation of selecting and moving a part of a plurality of icon images displayed on a display screen as a movement source icon, and a "display position changer" that changes, when such an operation is received, a display position of the movement source icon assuming that a first position of the movement source icon is selected on the display screen.

According to such a configuration, it is possible to unify operating feelings at the time of operation when changing the arrangement of a plurality of icons.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An image display device comprising:
   an operation receiver that receives a touch operation to a part of a movement source icon to move the movement source icon from one predetermined location to another predetermined location on a display screen, wherein the movement source icon is at least one of a plurality of icon images displayed on the display screen; and
   a hardware processor that moves the movement source icon based on the touch operation, wherein
   before moving the movement source icon based on the touch operation, the hardware processor shifts a display position of the movement source icon such that a first position of the movement source icon matches a touched position on the display screen while the part of the movement source icon is being touched,
   a movement destination icon, displayed at a movement destination of the movement source icon, has a reaction area and a non-reaction area with respect to a finger touching the display screen,
   the movement source icon and the movement destination icon each have a horizontally long rectangular shape,
   the non-reaction area has a rectangular shape and is disposed in at least one of a right-side area and a left-side area within the movement destination icon,
   the hardware processor is configured to determine:
      in one instance, that the touched position has entered the movement destination icon within the reaction area, and
      in another instance, that the touched position has entered the movement destination icon within the non-reaction area,
   the hardware processor is further configured to determine that the touched position has entered the reaction area, and
   after moving the movement source icon and determining that the touched position has entered the reaction area, the hardware processor replaces the movement destination icon with the movement source icon.

2. The image display device according to claim 1, wherein the hardware processor moves, based on a moving direction of the movement source icon, the movement destination icon to a position where the movement source icon has been displayed.

3. The image display device according to claim 1, wherein after moving the movement source icon, the hardware processor determines whether the touched position has entered the reaction area within a predetermined period of time, and upon determining that the touched position has entered the reaction area within the predetermined period of time, the hardware processor replaces the movement destination icon with the movement source icon.

4. The image display device according to claim 1, wherein the first position is a center position of the movement source icon.

5. The image display device according to claim 4, wherein the center position is a center in a moving direction of the movement source icon.

6. The image display device according to claim 5, wherein when the moving direction of the movement source icon is oblique, the hardware processor sets the center position to a center in a horizontal direction and a vertical direction of the movement source icon.

7. The image display device according to claim 1, wherein the hardware processor corrects the display position of the movement source icon such that the first position of the movement source icon becomes a position at which an instruction is given by a user.

8. The image display device according to claim 1, wherein once the operation receiver receives the touch operation, the hardware processor reads coordinates of a position at which an instruction is given by a user as coordinates of the first position of the movement source icon being currently displayed, and
the hardware processor moves the movement destination icon when the first position of the movement source icon enters the reaction area of the movement destination icon.

9. An image forming apparatus comprising:
the image display device according to claim 1;
an image former that forms an image on a sheet; and
a hardware processor that controls the image former, wherein
the image display device displays the icon images each specifying a process executed by the hardware processor on the display screen.

10. A display position changing method comprising:
receiving a touch operation to a part of a movement source icon to move the movement source icon from one predetermined location to another predetermined location on a display screen, wherein the movement source icon is at least one of a plurality of icon images displayed on the display screen; and
before moving the movement source icon based on the touch operation, shifting a display position of the movement source icon such that a first position of the movement source icon matches a touched position on the display screen while the part of the movement source icon is being touched, wherein
a movement destination icon, displayed at a movement destination of the movement source icon, has a reaction area and a non-reaction area with respect to a finger touching the display screen,
the movement source icon and the movement destination icon each have a horizontally long rectangular shape,
the non-reaction area has a rectangular shape and is disposed in at least one of a right-side area and a left-side area within the movement destination icon,
the method further comprises:
determining:
in one instance, that the touched position has entered the movement destination icon within the reaction area, and
in another instance, that the touched position has entered the movement destination icon within the non-reaction area,
further determining that the touched position has entered the reaction area, and
after moving the movement source icon and determining that the touched position has entered the reaction area, replacing the movement destination icon with the movement source icon.

11. A non-transitory recording medium storing instructions causing a computer to function as:
an operation receiver that receives a touch operation to a part of a movement source icon to move the movement source icon from one predetermined location to another predetermined location on a display screen, wherein the movement source icon is at least one of a plurality of icon images displayed on the display screen; and
a hardware processor that,
before moving the movement source icon based on the touch operation, shifts a display position of the movement source icon such that a first position of the movement source icon matches a touched position on the display screen while the part of the movement source icon is being touched, wherein
a movement destination icon, displayed at a movement destination of the movement source icon, has a reaction area and a non-reaction area with respect to a finger touching the display screen,
the movement source icon and the movement destination icon each have a horizontally long rectangular shape,
the non-reaction area has a rectangular shape and is disposed in at least one of a right-side area and a left-side area within the movement destination icon,
the hardware processor is configured to determine:
in one instance, that the touched position has entered the movement destination icon within the reaction area, and
in another instance, that the touched position has entered the movement destination icon within the non-reaction area,
the hardware processor is further configured to determine that the touched position has entered the reaction area, and
after moving the movement source icon and determining that the touched position has entered the reaction area, replaces the movement destination icon with the movement source icon.

* * * * *